US010722866B2

(12) United States Patent
Yoshikawa et al.

(10) Patent No.: US 10,722,866 B2
(45) Date of Patent: Jul. 28, 2020

(54) TITANIUM OXIDE FILM AND STRUCTURE

(71) Applicant: FUJI XEROX CO., LTD., Tokyo (JP)

(72) Inventors: Hideaki Yoshikawa, Kanagawa (JP); Sakae Takeuchi, Kanagawa (JP); Yasunobu Kashima, Kanagawa (JP); Takeshi Iwanaga, Kanagawa (JP); Hiroyoshi Okuno, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 53 days.

(21) Appl. No.: 16/120,316

(22) Filed: Sep. 3, 2018

(65) Prior Publication Data

US 2019/0224648 A1  Jul. 25, 2019

(30) Foreign Application Priority Data

Jan. 25, 2018  (JP) .................................. 2018-010752

(51) Int. Cl.

| | | |
|---|---|---|
| *B01J 21/06* | (2006.01) | |
| *B01J 31/02* | (2006.01) | |
| *B01J 31/38* | (2006.01) | |
| *B01J 35/00* | (2006.01) | |
| *B01J 35/10* | (2006.01) | |
| *B01J 31/06* | (2006.01) | |
| *B01J 37/02* | (2006.01) | |

(52) U.S. Cl.
CPC ............ *B01J 21/063* (2013.01); *B01J 21/06* (2013.01); *B01J 31/02* (2013.01); *B01J 31/069* (2013.01); *B01J 31/38* (2013.01); *B01J 35/004* (2013.01); *B01J 35/0073* (2013.01); *B01J 35/10* (2013.01); *B01J 37/0219* (2013.01); *B01J 37/0225* (2013.01); *B01J 31/0202* (2013.01); *B01J 31/0212* (2013.01); *B01J 31/0237* (2013.01); *B01J 31/0274* (2013.01); *B01J 31/0275* (2013.01)

(58) Field of Classification Search
CPC . B01J 21/063; B01J 21/06; B01J 31/02; B01J 31/08; B01J 31/0211; B01J 35/004; B01J 35/0073; B01J 35/10
USPC ............ 502/171, 350; 106/286.4, 287.1, 436
See application file for complete search history.

(56) References Cited

U.S. PATENT DOCUMENTS

| | | | | |
|---|---|---|---|---|
| 6,228,480 B1* | 5/2001 | Kimura | .................. | B01J 35/002 106/287.13 |
| 6,284,365 B1* | 9/2001 | Hirose | ................. | B01J 31/1633 427/387 |
| 6,663,851 B1* | 12/2003 | Deller | ...................... | A61K 8/29 106/436 |
| 7,030,058 B1* | 4/2006 | Nakabayashi | ......... | B01J 35/002 502/401 |
| 7,153,808 B2* | 12/2006 | Iwamoto | ................ | B01J 21/063 502/200 |
| 2006/0177671 A1* | 8/2006 | Nakayama | ............. | B01J 31/123 428/447 |
| 2008/0207937 A1* | 8/2008 | Dawes | ................. | H01G 9/2031 556/465 |
| 2009/0094954 A1* | 4/2009 | Nakayama | ............... | C08J 7/045 55/524 |
| 2010/0112024 A1* | 5/2010 | Sharma | .................. | A01N 59/16 424/409 |
| 2013/0164444 A1* | 6/2013 | Tokumitsu | ........... | C01G 23/053 427/219 |
| 2013/0277300 A1* | 10/2013 | Nunes | .................... | B01D 69/02 210/500.25 |
| 2014/0186613 A1* | 7/2014 | Liang | ..................... | C09D 5/006 428/328 |
| 2014/0197387 A1* | 7/2014 | Miyao | ...................... | C08J 5/005 257/40 |
| 2014/0206801 A1* | 7/2014 | Sato | ........................ | C01G 25/02 524/264 |
| 2017/0252736 A1 | 9/2017 | Hirose et al. | | |
| 2018/0280933 A1* | 10/2018 | Okuno | .................. | B01J 21/063 |
| 2018/0311643 A1* | 11/2018 | Okuno | ................. | B01J 37/0219 |
| 2019/0255515 A1* | 8/2019 | Takeuchi | ................. | C09D 7/67 |

FOREIGN PATENT DOCUMENTS

| | | |
|---|---|---|
| JP | 2006104541 | 4/2006 |
| JP | 2014128768 | 7/2014 |
| JP | 2017159293 | 9/2017 |

* cited by examiner

*Primary Examiner* — Patricia L. Hailey
(74) *Attorney, Agent, or Firm* — JCIPRNET

(57) ABSTRACT

A titanium oxide film by continuous titanium oxide, includes a metallic compound that has a metal atom and a hydrocarbon group and is bonded to a surface of the film, in which absorption occurs at wavelengths of 450 nm and 750 nm.

19 Claims, No Drawings ary embodiment is a titanium oxide film by continuous titanium oxide, including a metallic compound that has a metal atom and a hydrocarbon group and is bonded to a surface of the film, in which absorption occurs at wavelengths of 450 nm and 750 nm.

TITANIUM OXIDE FILM AND STRUCTURE

CROSS-REFERENCE TO RELATED APPLICATIONS

This application is based on and claims priority under 35 USC 119 from Japanese Patent Application No. 2018-010752 filed Jan. 25, 2018.

BACKGROUND

(i) Technical Field

The present invention relates to a titanium oxide film and a structure.

(ii) Related Art

JP2006-104541A discloses a method for forming an amorphous titanium oxide thin film having a photocatalytic performance, the method including forming a titanium oxide film on a substrate while irradiating a vapor stream of titanium oxide on a substrate or in vapor deposition with an ion beam.

JP2014-128768A discloses a method for manufacturing a photocatalyst, including a first step of mixing titanium butoxide in an organic solvent aqueous solution, hydrolyzing the titanium butoxide by heating the resultant mixture at 150° C. to 220° C., and drying the heated mixture to obtain an intermediate product, and a second step of calcining the intermediate product at 150° C. to 300° C.

JP2017-159293A discloses a titanium oxide particle which is surface-treated with a metal-containing compound having a hydrocarbon group, in which absorption occurs by the particle at 450 nm and 750 nm in a visible absorption spectrum, and an absorption peak is within a range of 2700 $cm^{-1}$ to 3000 $cm^{-1}$ in an infrared absorption spectrum.

SUMMARY

The titanium oxide film formed by the method disclosed in JP2006-104541A is an ultraviolet light-responsive photocatalytic film and has no visible-light responsiveness.

The photocatalyst disclosed in JP2014-128768A or JP2017-159293A has the visible-light responsiveness, but a shape thereof is in a form of particle or powder. In order to obtain a photocatalytic film by using the particulate or powdered photocatalyst, the photocatalytic film is generally formed by bonding the photocatalyst with a binder. Such a photocatalytic film is not a film in which an entire surface of the film exhibits a photocatalytic function, due to the presence of a binder having no photocatalytic function. In addition, in such a photocatalytic film, fine unevenness based on the shape of the particulate or powdered photocatalyst is present on the surface of the film.

Aspects of non-limiting embodiments of the present disclosure relate to a titanium oxide film having an excellent visible light-responsive photocatalytic function and an excellent contamination resistance, compared to a titanium oxide film in which a visible light-responsive titanium oxide particle is bonded by a binder.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a titanium oxide film by continuous titanium oxide, including a metallic compound that has a metal atom and a hydrocarbon group and is bonded to a surface of the film, in which absorption occurs at wavelengths of 450 nm and 750 nm.

DETAILED DESCRIPTION

Hereinafter, an exemplary embodiment of the invention will be described. These descriptions and examples are exemplified as the exemplary embodiment and are not to limit the scope of the invention.

In a case where plural kinds of substances corresponding to each component in the composition are present, a case of mentioning an amount of each component in a composition in the present disclosure means a total amount of the plural kinds of substances present in the composition, unless otherwise specified.

A numerical value range indicated by using "to" in the present disclosure indicates a range including numerical values described before and after "to" as a minimum value and a maximum value.

In the present disclosure, in regard to the term "step", not only an independent step but also a step which is not clearly distinguishable from other steps is included in this term as long as an intended purpose of the step may be achieved.

Titanium Oxide Film

A titanium oxide film according to a first exemplary embodiment is a titanium oxide film by continuous titanium oxide, including a metallic compound that has a metal atom and a hydrocarbon group and is bonded to a surface of the film, in which absorption occurs at wavelengths of 450 nm and 750 nm in a visible absorption spectrum. The metallic compound having a metal atom and a hydrocarbon group in the present disclosure will simply be referred to as an "organometallic compound."

A titanium oxide film according to a second exemplary embodiment is a titanium oxide film by continuous titanium oxide, in which an absorption peak is in a wavenumber range of 2700 $cm^{-1}$ to 3000 $cm^{-1}$ in an infrared absorption spectrum, and absorption occurs at wavelengths of 450 nm and 750 nm in the visible absorption spectrum.

With the organometallic compound bonded to the surface of the titanium oxide film similar to the first exemplary embodiment, the absorption peak in the wavenumber range of 2700 $cm^{-1}$ to 3000 $cm^{-1}$ in an infrared absorption spectrum similar to the second exemplary embodiment is likely to be realized. In other words, the condition in which the titanium oxide film has the absorption peak in the wavenumber range of 2700 $cm^{-1}$ to 3000 $cm^{-1}$ in an infrared absorption spectrum, is an index indicating that the titanium oxide film has been surface-modified so that the organometallic compound is bonded to the surface.

Hereinafter, matters that are common in the first exemplary embodiment and the second exemplary embodiment will be collectively described with this exemplary embodiment.

Hereinafter, characteristics of the titanium oxide film according to this exemplary embodiment will be described.

Characteristics of Titanium Oxide Film

In this exemplary embodiment, the phrase "titanium oxide film by continuous titanium oxide" means that particulate or powdered titanium oxide is not a film that is bonded by a component other than titanium oxide. The continuous titanium oxide can be confirmed by, when the surface of the film is observed by a transmission electron microscope, titanium oxide being continuously formed to exceed a size (generally, micrometer order) of agglomerated particles of general titanium oxide particles, and by composition analysis of the titanium oxide film.

In the titanium oxide film in this exemplary embodiment, it is, for example, preferable that the film is continuous in all directions without gaps, but a gap may be present in a part as long as the effect of this exemplary embodiment is not impaired.

In the titanium oxide film according to this exemplary embodiment, absorption occurs at wavelengths of 450 nm and 750 nm in the visible absorption spectrum.

In the titanium oxide film according to this exemplary embodiment, for example, the absorption preferably occurs at wavelengths of 450 nm, 600 nm, and 750 nm in the visible absorption spectrum, the absorption more preferably occurs in an entire wavelength range of 450 nm to 750 nm in the visible absorption spectrum, and the absorption particularly preferably occurs at wavelengths in an entire wavelength range of 400 nm to 800 nm in the visible absorption spectrum, from the viewpoint of excellent visible light-responsive photocatalytic function.

In regard to the titanium oxide film according to this exemplary embodiment, when an absorbance at a wavelength of 350 nm is taken as 1 in an ultraviolet-visible absorption spectrum, although there is no particular limitation, the absorbance at a wavelength of 450 nm is preferably 0.02 or higher (for example, more preferably 0.1 or higher and even more preferably 0.2 or higher), the absorbance at a wavelength of 600 nm is preferably 0.02 or higher (for example, more preferably 0.1 or higher and even more preferably 0.2 or higher), and the absorbance at a wavelength of 750 nm is preferably 0.02 or higher (for example, more preferably 0.1 or higher and even more preferably 0.2 or higher), from the viewpoint of excellent visible light-responsive photocatalytic function.

In regard to the ultraviolet-visible absorption spectrum of titanium oxide film, a diffuse reflectance spectrum in a wavelength range of 200 nm to 900 nm is measured in a diffuse reflection arrangement using the titanium oxide film as a measurement target. Based on the diffuse reflectance spectrum, a theoretical absorbance at each wavelength is obtained by Kubelka-Munk transformation, and therefore the ultraviolet-visible absorption spectrum is obtained.

The titanium oxide film according to the second exemplary embodiment has at least one absorption peak in a wavenumber range of 2700 $cm^{-1}$ to 3000 $cm^{-1}$ in the infrared absorption spectrum.

For example, the titanium oxide film according to the first exemplary embodiment preferably has at least one absorption peak in a wavenumber range of 2700 $cm^{-1}$ to 3000 $cm^{-1}$ in the infrared absorption spectrum.

The term "absorption peak" in the infrared absorption spectrum in this exemplary embodiment means absorption in which an absorption intensity (absorbance) is 0.022 or greater (5% of light transmittance) occurs.

With the titanium oxide film as the measurement target, the infrared absorption spectrum of the titanium oxide film is obtained by measuring the wavenumber range of 650 $cm^{-1}$ to 4000 $cm^{-1}$ by a total reflection measurement method using diamond as a spectroscopic crystal by using an infrared spectrophotometer under conditions of a cumulative number of 300 times and resolution of 4 $cm^{-1}$.

In the titanium oxide film according to this exemplary embodiment, a surface roughness is, for example, preferably from 0 μm to 0.1 μm, more preferably from 0 μm to 0.08 μm, and even more preferably from 0 μm to 0.05 μm, from the viewpoint of excellent contamination resistance. The surface roughness of the titanium oxide film according to this exemplary embodiment may be controlled by, for example, a method for forming a titanium oxide film.

In this exemplary embodiment, the surface roughness of the titanium oxide film is RzJIS (ten-point mean roughness). The surface roughness is measured as follows.

The surface of the titanium oxide film of the measurement target is measured at any four positions (two positions in a width direction×two positions in a length direction), and a mean value is defined as the surface roughness RzJIS by using a surface roughness and shape measuring instrument according to JIS B 0601 (2013) under conditions of a measurement length 2.5 mm, a cutoff wavelength 0.8 mm, and a measurement speed 0.60 mm/s.

In the titanium oxide film according to this exemplary embodiment, a water contact angle is, for example, preferably from 90 degrees to 180 degrees, more preferably from 115 degrees to 180 degrees, and even more preferably from 130 degrees to 180 degrees, from the viewpoint of excellent contamination resistance. The water contact angle of the titanium oxide film according to this exemplary embodiment may be controlled according to, for example, a type or an amount of the organometallic compound used for the surface modification.

The water contact angle of the titanium oxide film is measured as follows. The titanium oxide film is left to stand for 24 hours or longer in an environment of a temperature of 25° C. and a relative humidity of 60% and subjected to humidity conditioning, and then 2 μL droplets of deionized water is injected to the surface of the titanium oxide film with a syringe under the same environment of the temperature and the humidity, and a contact angle after 30 seconds is measured by a θ/2 method using a contact angle meter.

A film thickness of the titanium oxide film according to this exemplary embodiment is, for example, preferably 0.01 μm or more, more preferably 0.03 μm or more, even more preferably 0.05 μm or more from the viewpoint of photocatalytic activity and durability, and the film thickness is, for example, preferably 5 μm or less, more preferably 3 μm or less, and even more preferably 1 μm or less from the viewpoint suppressing peeling, cracking, or warpage.

A mass per unit area of the titanium oxide film according to this exemplary embodiment is, for example, preferably 0.04 $g/m^2$ or more, more preferably 0.12 $g/m^2$ or more, and even more preferably 0.2 $g/m^2$ or more from the viewpoint of the photocatalytic activity and the durability, and the mass per unit area is, for example, preferably 20 $g/m^2$ or less, more preferably 12 $g/m^2$ or less, and even more preferably 5 $g/m^2$ or less from the viewpoint suppressing peeling, cracking, or warpage.

Hereinafter, a configuration of the titanium oxide film according to this exemplary embodiment will be described.

The titanium oxide film according to this exemplary embodiment is a titanium oxide film of which the surface is modified. The titanium oxide film according to this exemplary embodiment is, for example, preferably a titanium oxide film obtained by surface-treating an untreated titanium oxide film with the metallic compound (organometallic compound) having a metal atom and a hydrocarbon group, and carbonizing or oxidizing apart of the hydrocarbon group by a heating treatment. In the present disclosure, the untreated titanium oxide film is referred to as an "original film."

Untreated Titanium Oxide Film (Original Film)

The original film is the titanium oxide film by continuous titanium oxide. The original film corresponds to a titanium oxide layer in a method for manufacturing a titanium oxide film according to this exemplary embodiment to be described later.

The original film in this exemplary embodiment includes a titanium oxide film formed by vapor phase growth of titanium oxide, a titanium oxide film obtained by chemically reacting a material substance of titanium oxide, a titanium oxide film formed by calcinating particulate or powdered titanium oxide or metatitanic acid, a titanium oxide film obtained by calcinating a composition containing titanium oxide and components other than titanium oxide and removing the components other than titanium oxide, and the like.

The original film may be amorphous or crystalline, and is preferably crystalline from the viewpoint of a high level of the photocatalytic activity, for example. That is, for example, the original film is preferably a titanium oxide film in which crystals of titanium oxide are continuous. In a case where the original film is crystalline, a crystal structure thereof may be a single crystal structure such as brookite, anatase, rutile, or the like and may be a mixed-crystal structure in which these crystals coexist. The original film is, for example, preferably a titanium oxide film in which anatase crystals of titanium oxide are continuous from the viewpoint of a high level of the photocatalytic activity.

A film thickness of the original film according to this exemplary embodiment is, for example, preferably 0.01 μm or more, more preferably 0.03 μm or more, even more preferably 0.05 μm or more from the viewpoint of photocatalytic activity and durability, and the film thickness is, for example, preferably 5 μm or less, more preferably 3 μm or less, and even more preferably 1 μm or less from the viewpoint suppressing peeling, cracking, or warpage.

Metallic Compound Having Metal Atom and Hydrocarbon Group (Organometallic Compound)

The organometallic compound bonded to the surface of the titanium oxide film according to this exemplary embodiment is derived from the organometallic compound used for the surface treatment of the original film.

In the titanium oxide film according to this exemplary embodiment, the organometallic compound is, for example, preferably a metallic compound consisting only of a metal atom, a carbon atom, a hydrogen atom, and an oxygen atom from the viewpoint of more easily expressing visible-light responsiveness.

From the viewpoint of more easily expressing the visible-light responsiveness, the organometallic compound is, for example, preferably bonded to the surface of the titanium oxide film via an oxygen atom. The organometallic compound is, for example, preferably bonded to the surface of the titanium oxide film via the oxygen atom O that is directly bonded to the metal atom M in the organometallic compound, that is, preferably bonded to the surface of the titanium oxide film via the covalent bond of M-O—Ti, from the viewpoint of more easily expressing the visible-light responsiveness.

The organometallic compound is, for example, preferably an organometallic compound having the metal atom M and the hydrocarbon group directly bonded to the metal atom M, from the viewpoint of more easily expressing the visible-light responsiveness. The organometallic compound is, for example, preferably bonded to the surface of the titanium oxide film via the oxygen atom O that is directly bonded to the metal atom M in the organometallic compound. That is, for example, it is preferable that a structure (hydrocarbon group-M-O—Ti) in which the hydrocarbon group, the metal atom M, the oxygen atom O, and the titanium atom Ti are sequentially linked by a covalent bond, is present on the surface of the titanium oxide film, from the viewpoint of more easily expressing the visible-light responsiveness.

As the metal atom constituting the organometallic compound, for example, silicon, aluminum, or titanium is preferable, silicon or aluminum is more preferable, and silicon is particularly preferable, from the viewpoint of more easily expressing the visible-light responsiveness.

Examples of the hydrocarbon group contained in the organometallic compound include a saturated or unsaturated aliphatic hydrocarbon group having 1 to 40 carbon atoms (for example, preferably 1 to 20 carbon atoms, more preferably 1 to 18 carbon atoms, even more preferably 4 to 12 carbon atoms, and still more preferably 4 to 10 carbon atoms), and an aromatic hydrocarbon group having 6 to 27 carbon atoms (for example, preferably 6 to 20 carbon atoms, more preferably 6 to 18 carbon atoms, even more preferably 6 to 12 carbon atoms, and still more preferably 6 to 10 carbon atoms).

The hydrocarbon group contained in the organometallic compound is, for example, preferably the aliphatic hydrocarbon group, more preferably the saturated aliphatic hydrocarbon group, and particularly preferably an alkyl group, from viewpoints of expressing the visible-light responsiveness and hydrophobicity. The aliphatic hydrocarbon group may be either linear, branched, or cyclic, but is, for example, preferably linear or branched, from the viewpoint of the hydrophobicity. The number of carbon atoms of the aliphatic hydrocarbon group is, for example, preferably from 1 to 20, more preferably from 1 to 18, even more preferably 4 to 12, and still more preferably from 4 to 10.

Details of the hydrocarbon group contained in the organometallic compound are the same as those of the hydrocarbon group in the organometallic compound used in a surface treatment step to be described later, and a preferable aspect thereof is also the same.

Method for Manufacturing Titanium Oxide Film

For example, the method for manufacturing a titanium oxide film according to this exemplary embodiment preferably includes a step of forming the titanium oxide layer by continuous titanium oxide on a base material, a step of surface-treating the titanium oxide layer with the organometallic compound (surface treatment step), and a step of heating the titanium oxide layer surface-treated with the organometallic compound during or after the surface treatment (heating treatment step).

Step of Forming Titanium Oxide Layer

Examples of the method for forming the titanium oxide layer on the base material include a vacuum deposition method, an ion-assisted vapor deposition method, a plasma-assisted vapor deposition method, a chemical vapor deposition method, a reactive sputtering method, a sol-gel method using titanium alkoxide as a material, a method in which titanium oxide particles or metatitanic acid particles are used as a material and calcined in a film form, and the like.

As the method for forming the titanium oxide layer, for example, a sol-gel method using titanium alkoxide as a material is preferable, from the viewpoint of obtaining the titanium oxide layer having excellent surface smoothness. Hereinafter, the sol-gel method using titanium alkoxide will be described.

The sol-gel method using titanium alkoxide is a method in which titania sol applied on the base material is calcined, and therefore the titanium oxide layer is formed.

The titania sol is a liquid composition in the form of a sol obtained by mixing titanium alkoxide, an alcohol, and an acid. In the titania sol, titanium oxide produced by reaction (hydrolysis and condensation) of titanium alkoxide is contained. The titania sol may be obtained, for example, by mixing titanium alkoxide, an alcohol, and an acid, and then leaving the resultant mixture to stand at a temperature of 25° C. to 55° C. for 30 minutes to 120 minutes to proceed a titanium alkoxide reaction.

Examples of the titanium alkoxide used for preparation of the titania sol include tetraalkoxy titanium such as tetramethoxy titanium, tetraethoxy titanium, tetrapropoxy titanium, and tetrabutoxy titanium, an alkoxy titanium chelate obtained by chelating a part of an alkoxy group such as di-i-propoxy bis (ethyl acetoacetate) titanium and di-i-propoxy bis (acetylacetonato) titanium, and the like. These may be used alone or in combination of two or more thereof.

Examples of the alcohol used for the preparation of the titania sol include methanol, ethanol, propanol, butanol, and the like. These may be used alone or in combination of two or more thereof.

Examples of the acid used for the preparation of the titania sol include an oxalic acid, an acetic acid, a hydrochloric acid, a nitric acid, and the like. These may be used alone or in combination of two or more thereof. These are generally mixed with titanium alkoxide and alcohol as an acid aqueous solution.

A concentration of solid contents of the titania sol is, for example, preferably from 1% by mass to 30% by mass.

Examples of a method for applying the titania sol on the base material include a knife coating method, a wire bar coating method, a die coating method, a roll coating method, a reverse roll coating method, a dip coating method, a spin coating method, a gravure printing method, a screen printing method, an ink jet method, a spray method, and the like. Among these, for example, a wire bar coating method or an ink jet method is preferable from the viewpoint of forming a thin film having high evenness.

A heating method for calcinating the titania sol on the base material is not particularly limited, and for example, a known heating method such as heating by an electric furnace, a baking furnace (roller hearth kiln, shuttle kiln, and the like), a radiant heating furnace, or the like; and heating by laser light, infrared rays, UV, microwave, or the like is applied.

Because a crystal structure of titanium oxide changes into noncrystalline, brookite crystal, anatase crystal, and rutile crystal in accordance with a degree of a calcination temperature, and therefore by adjusting a degree of the calcination temperature, a desired crystalline titanium oxide layer may be obtained. From the viewpoint of obtaining the crystalline titanium oxide layer, the calcination temperature is, for example, preferably from 200° C. to 800° C., and more preferably from 400° C. to 600° C.

From the viewpoint of realizing the above-described calcination temperature, the base material to which the titania sol is applied preferably has heat resistance, for example. As the base material, from the viewpoint of the heat resistance, a base material containing a material selected from the group consisting of a glass, a ceramic, a metal, and a heat-resistant resin is preferable, and a base material formed of a material selected from the group consisting of a glass, a ceramic, a metal, and a heat-resistant resin is more preferable, although there is no particular limitation. Examples of the metal include aluminum, stainless steel, iron, and the like. Examples of the heat-resistant resin include whole aromatic polyamide, polyamide imide, polyimide, polyether sulfone, polysulfone, polyether ketone, polyether imide, polysulfone, polyether sulfone, polyketone, cellulose, polyvinylidene fluoride, and the like.

Surface Treatment Step

The surface treatment step is a step of reacting the organometallic compound and the surface of the titanium oxide layer. In the surface treatment step, a reactive group (for example, hydrolyzable groups such as a halogeno group and an alkoxy group) in the organometallic compound is reacted with a reactive group (for example, a hydroxyl group) present on the surface of the titanium oxide layer, and therefore the surface treatment of the titanium oxide layer is carried out.

Examples of the surface treatment method is not particularly limited, but examples thereof include a method for allowing the organometallic compound itself to directly come into contact with the titanium oxide layer; and a method for allowing the titanium oxide layer to come into contact with a treatment liquid in which the organometallic compound is dissolved in a solvent. Specific examples thereof include a method of dropwise adding, spraying, and applying the organometallic compound itself or a treatment liquid to the titanium oxide layer.

The organometallic compound used in the surface treatment is, for example, preferably an organometallic compound having the metal atom and the hydrocarbon group directly bonded to the metal atom. In a case where the organometallic compound has plural hydrocarbon groups, for example, it is preferable that at least one hydrocarbon group is directly bonded to the metal atom in the organometallic compound.

As the metal atom of the organometallic compound, for example, silicon, aluminum, or titanium is preferable, silicon or aluminum is more preferable, and silicon is particularly preferable.

Examples of the hydrocarbon group contained in the organometallic compound include a saturated or unsaturated aliphatic hydrocarbon group having 1 to 40 carbon atoms (for example, preferably 1 to 20 carbon atoms, more preferably 1 to 18 carbon atoms, even more preferably 4 to 12 carbon atoms, and still more preferably 4 to 10 carbon atoms), and an aromatic hydrocarbon group having 6 to 27 carbon atoms (for example, preferably 6 to 20 carbon atoms, more preferably 6 to 18 carbon atoms, even more preferably 6 to 12 carbon atoms, and still more preferably 6 to 10 carbon atoms).

The hydrocarbon group contained in the organometallic compound is, for example, preferably the aliphatic hydrocarbon group, more preferably the saturated aliphatic hydrocarbon group, and particularly preferably an alkyl group, from viewpoints of expressing the visible-light responsiveness and hydrophobicity. The aliphatic hydrocarbon group may be either linear, branched, or cyclic, but is, for example, preferably linear or branched, from the viewpoint of the hydrophobicity. The number of carbon atoms of the aliphatic hydrocarbon group is, for example, preferably from 1 to 20 preferably, more preferably from 1 to 18, even more preferably 4 to 12, and still more preferably from 4 to 10.

As the organometallic compound, for example, a silane compound having the hydrocarbon group is particularly preferable. Examples of the silane compound having the hydrocarbon group include a chlorosilane compound, an alkoxysilane compound, a silazane compound (such as hexamethyldisilazane), and the like.

The silane compound having the hydrocarbon group, which is used in the surface treatment is, for example, preferably an $R^1{}_n SiR^2{}_m$ compound represented by Formula (1), from the viewpoints of expressing the visible-light responsiveness and the hydrophobicity.

In $R^1{}_n SiR^2{}_m$ of Formula (1), $R^1$ represents a saturated or unsaturated aliphatic hydrocarbon group having 1 to 20 carbon atoms, or an aromatic hydrocarbon group having 6 to 20 carbon atoms, $R^2$ represents a halogen atom or an alkoxy group, n represents an integer of 1 to 3, and m represents an integer of 1 to 3, provided that n+m=4. In a case where n is an integer of 2 or 3, plural $R^1$'s may be the same groups, or may be different groups. In a case where m is an integer of 2 or 3, plural $R^2$'s may be the same groups, or may be different groups.

The aliphatic hydrocarbon group represented by $R^1$ may be either linear, branched, or cyclic, but is, for example, preferably linear or branched, from the viewpoint of the hydrophobicity. The number of carbon atoms of the aliphatic hydrocarbon group is, for example, preferably from 1 to 20; more preferably from 1 to 18, even more preferably 4 to 12, and still more preferably from 4 to 10, from the viewpoints of expressing the visible-light responsiveness and the hydrophobicity. The aliphatic hydrocarbon group may be either saturated or unsaturated, but is, for example, preferably the saturated aliphatic hydrocarbon group, and more preferably an alkyl group, from the viewpoints of expressing the visible-light responsiveness and the hydrophobicity.

Examples of the saturated aliphatic hydrocarbon group include linear alkyl groups (such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group), branched alkyl groups (such as an isopropyl group, an isobutyl group, an isopentyl group, a neopentyl group, a 2-ethylhexyl group, a tertiary butyl group, a tertiary pentyl group, and an isopentadecyl group), cyclic alkyl groups (such as a cyclopropyl group, a cyclopentyl group, a cyclohexyl group, a cycloheptyl group, a cyclooctyl group, a tricyclodecyl group, a norbornyl group, and an adamantyl group), and the like.

Examples of the unsaturated aliphatic hydrocarbon group include alkenyl groups (such as a vinyl group (an ethenyl group), a 1-propenyl group, a 2-propenyl group, a 2-butenyl group, a 1-butenyl group, a 1-hexenyl group, a 2-dodecenyl group, and a pentenyl group), alkynyl groups (such as an ethynyl group, a 1-propynyl group, a 2-propynyl group, a 1-butynyl group, a 3-hexynyl group, and a 2-dodecynyl group), and the like.

The aliphatic hydrocarbon group includes a substituted aliphatic hydrocarbon group. Examples of a substituent that may be substituted on the aliphatic hydrocarbon group include a halogen atom, an epoxy group, a glycidyl group, a glycidoxy group, a mercapto group, a methacryloyl group, an acryloyl group, and the like.

The aromatic hydrocarbon group represented by $R^1$, for example, preferably has 6 to 20 carbon atoms, more preferably 6 to 18 carbon atoms, even more preferably 6 to 12 carbon atoms, and still more preferably 6 to 10 carbon atoms.

Examples of the aromatic hydrocarbon group include a phenylene group, a biphenylene group, a terphenylene group, a naphthalene group, an anthracene group, and the like.

The aromatic hydrocarbon group includes a substituted aromatic hydrocarbon group. Examples of a substituent that may be substituted on the aromatic hydrocarbon group include a halogen atom, an epoxy group, a glycidyl group, a glycidoxy group, a mercapto group, a methacryloyl group, an acryloyl group, and the like.

Examples of the halogen atom represented by $R^2$ include a fluorine atom, a chlorine atom, a bromine atom, an iodine atom, and the like. As the halogen atom, a chlorine atom, a bromine atom, or an iodine atom is preferable, for example.

Examples of the alkoxy group represented by $R^2$ include an alkoxy group having 1 to 10 carbon atoms (for example, preferably 1 to 8, more preferably 3 to 8). Examples of the alkoxy group include a methoxy group, an ethoxy group, an isopropoxy group, a t-butoxy group, an n-butoxy group, an n-hexyloxy group, a 2-ethylhexyloxy group, a 3,5,5-trimethylhexyloxy group, and the like. The alkoxy group includes a substituted alkoxy group. Examples of a substituent that may be substituted on the alkoxy group include a halogen atom, a hydroxyl group, an amino group, an alkoxy group, an amido group, a carbonyl group, and the like.

In the $R^1{}_n SiR^2{}_m$ compound represented by Formula (1), $R^1$ is, for example, preferably a compound that is the saturated aliphatic hydrocarbon group, from the viewpoints of expressing the visible-light responsiveness and the hydrophobicity. In the $R^1{}_n SiR^2{}_m$ compound represented by Formula (1), for example, it is particularly preferable that $R^1$ is the saturated aliphatic hydrocarbon group having 1 to 20 carbon atoms, $R^2$ is a halogen atom or an alkoxy group, n is an integer of 1 to 3, and m is an integer of 1 to 3, provided that n+m=4.

Examples of the $R^1{}_n SiR^2{}_m$ compound represented by Formula (1) include a silane compound such as vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (hereinbefore, n=1 and m=3);

dimethyldimethoxysilane, dimethyldiethoxysilane, methylvinyldimethoxysilane, methylvinyldiethoxysilane, diphenyldimethoxysilane, diphenyldiethoxysilane, dimethyldichlorosilane, and dichlorodiphenylsilane (hereinbefore, n=2 and m=2);

trimethylmethoxysilane, trimethylethoxysilane, trimethylchlorosilane, decyldimethylchlorosilane, and triphenylchlorosilane (hereinbefore, n=3 and m=1); and 3-glycidoxypropyltrimethoxysilane, γ-methacryloxypropyltrimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, and γ-glycidyloxypropylmethyldimethoxysilane (hereinbefore, $R^1$ is a compound of the substituted aliphatic hydrocarbon group or the substituted aromatic hydrocarbon group). The silane compound may be used alone or in combination of two or more thereof.

The hydrocarbon group in the silane compound represented by Formula (1) is, for example, preferably the aliphatic hydrocarbon group, more preferably the saturated aliphatic hydrocarbon group, and particularly preferably an alkyl group, from the viewpoints of expressing the visible-light responsiveness and the hydrophobicity. The hydrocarbon group in the silane compound is, for example, preferably a saturated aliphatic hydrocarbon group having 1 to 20 carbon atoms, more preferably a saturated aliphatic hydrocarbon group having 1 to 18 carbon atoms, even more preferably a saturated aliphatic hydrocarbon group having 4 to 12 carbon atoms, and particularly preferably a saturated aliphatic hydrocarbon group having 4 to carbon atoms, from the viewpoints of expressing the visible-light responsiveness and the hydrophobicity.

Examples of a compound in which the metal atom of the organometallic compound is aluminum include aluminum chelate such as di-i-propoxy aluminum-ethyl acetoacetate; aluminate-based coupling agents such as acetoalkoxy-aluminum-diisopropylate; and the like.

Examples of a compound in which the metal atom of the organometallic compound is titanium include titanate-based coupling agents such as isopropyl triisostearoyl titanate, tetraoctyl bis(ditridecyl phosphite) titanate, and bis(dioctyl pyrophosphate) oxyacetate titanate; titanium chelate such as di-i-propoxy bis (ethyl acetoacetate) titanium, di-i-propoxy bis(acetylacetonato)titanium, di-i-propoxy bis(triethanolaminate) titanium, di-i-propoxytitanium diacetate, di-i-propoxytitanium dipropionate; and the like.

The organometallic compound may be used alone or in combination of two or more thereof.

In a case of using the treatment liquid obtained by mixing the organometallic compound with the solvent, a solvent used for preparation of the treatment liquid is not particularly limited as long as it is a solvent that is a chemical substance compatible with the organometallic compound. As the solvent used for the preparation of the treatment liquid, for example, alcohols such as methanol, ethanol, propanol, and butanol, and an organic solvent such as toluene, ethyl acetate, and acetone are preferable.

An amount of the organometallic compound in the treatment liquid is, for example, preferably from 10 parts by mass to 200 parts by mass, more preferably from 20 parts by mass to 180 parts by mass, and even more preferably from 50 parts by mass to 150 parts by mass with respect to 100 parts by mass of the solvent.

An amount of the organometallic compound used in the surface treatment is, for example, preferably from 0.004 g to 20 g, more preferably from 0.01 g to 15 g, and even more preferably from 0.04 g to 10 g with respect to 1 $m^2$ of the titanium oxide layer. In a case where the amount of the organometallic compound is 0.004 g or more, the visible-light responsiveness is easily expressed and the hydrophobicity is improved. In a case where the amount of the organometallic compound is 20 g or less, an amount of carbon derived from the organometallic compound, which is present on the surface of the titanium oxide film is suppressed from becoming excessive, and therefore a deterioration in the photocatalytic function due to remaining carbon is suppressed.

The amount of the organometallic compound used in the surface treatment depends on a thickness of the titanium oxide layer, but is, for example, preferably from 10% by mass to 100% by mass, more preferably from 20% by mass to 75% by mass, and even more preferably from 25% by mass to 50% by mass with respect to an amount of the titanium oxide layer.

A temperature in the surface treatment of the titanium oxide layer with the organometallic compound is, for example, preferably from 15° C. to 150° C., and more preferably from 20° C. to 100° C. A time of the surface treatment is, for example, preferably from 10 minutes to 120 minutes, and more preferably from 30 minutes to 90 minutes.

After the surface treatment, a drying treatment may be carried out for a purpose of removing a remaining organometallic compound and a residue such as a solvent in the treatment liquid. A drying temperature is, for example, preferably from 20° C. to 150° C.

Heating Treatment Step

The heating treatment is carried out during the step of surface-treating the titanium oxide layer, or after the step of surface-treating the titanium oxide layer.

The heating treatment may be carried out when surface-treating the titanium oxide layer with the organometallic compound; when performing the drying treatment after the surface treatment; or separately after the drying treatment. From a viewpoint of sufficient reaction of the surface of the titanium oxide layer and the organometallic compound before the heating treatment, the heating treatment is, for example, preferably carried out when performing the drying treatment after the surface treatment, or separately after the drying treatment, and from a viewpoint of appropriately performing the drying treatment, the heating treatment is, for example, more preferably carried out separately after the drying treatment.

A temperature in the heating treatment is, for example, preferably from 180° C. to 500° C., more preferably from 200° C. to 450° C., even more preferably from 250° C. to 400° C., from the viewpoints of expressing the visible-light responsiveness and the hydrophobicity. A time of the heating treatment is, for example, preferably from 10 minutes to 300 minutes, and more preferably from 30 minutes to 120 minutes, from the viewpoints of expressing the visible-light responsiveness and the hydrophobicity. In a case of carrying out the heating treatment during the step of surface-treating the titanium oxide layer, for example, it is preferable that first, the organometallic compound is sufficiently reacted at the temperature of the surface treatment, and then the heating treatment is carried out at the temperature of the heating treatment. In a case of carrying out the heating treatment in the drying treatment after the surface treatment, the temperature of the drying treatment is set as the temperature of the heating treatment, and the drying treatment is carried out.

With the temperature of the heating treatment being from 180° C. to 500° C., the titanium oxide film having the visible-light responsiveness is efficiently obtained. It is presumed that in a case of performing the heating treatment at the temperature from 180° C. to 500° C., the hydrocarbon group derived from the metallic compound which is present on the surface of the titanium oxide film is appropriately carbonized or oxidized.

From the viewpoint of realizing the above-described temperature, the base material used for manufacturing the titanium oxide film preferably has the heat resistance, although there is no particular limitation. Details of the base material having the heat resistance are as described above.

The heating treatment is preferably carried out in an atmosphere in which an oxygen concentration (volume %) is from 1% to 21%, for example. By carrying out the heating treatment in this oxygen atmosphere, the carbonization or oxidation of the hydrocarbon group derived from the metallic compound which is present on the surface of the titanium oxide film may be appropriately and sufficiently performed. The oxygen concentration (volume %) is, for example, preferably from 3% to 21%, and more preferably from 5% to 21%.

A method for the heating treatment is not particularly limited, and for example, a known heating method such as heating by an electric furnace, a baking furnace (roller hearth kiln, shuttle kiln, and the like), a radiant heating furnace, or the like; and heating by laser light, infrared rays, UV, microwave, or the like is applied.

Through the above-described steps, the titanium oxide film according to this exemplary embodiment may be obtained.

Structure

A structure according to this exemplary embodiment includes a base material, and the titanium oxide film according to this exemplary embodiment that is disposed on the base material. The structure according to this exemplary embodiment includes the titanium oxide film according to this exemplary embodiment on at least a part of the surface of the base material.

Examples of the base material include various materials irrespective of inorganic materials and organic materials, and a shape thereof is also not limited. Preferable examples of the base material include glass, ceramics, metals (aluminum, stainless steel, iron, and the like), heat-resistant resins (whole aromatic polyamide, polyamide imide, polyimide, polyether sulfone, polysulfone, polyether ketone, polyether imide, polysulfone, polyether sulfone, polyketone, cellulose, polyvinylidene fluoride, and the like), plastic, rubber, stone, cement, concrete, fiber, fabric, wood, paper, a combination thereof, a laminate thereof, and a product having at least one coating on the surface thereof.

Preferable examples of the base material in terms of a use include building materials, exterior materials, window frames, window glass, mirrors, tables, dishes, curtains, lenses, prisms, exterior and painting of vehicles, exterior of a mechanical apparatus, exterior of a product, dust protection covers and painting, traffic signs, various display devices, advertisement towers, sound insulation walls for roads, sound insulation walls for railroads, exterior and painting of bridges and guardrails, tunnel interior and painting, an insulator, solar cell cover, a heat collecting cover of a solar water heater, polymer film, polymer sheet, filter, an indoor signboard, an outdoor signboard, a cover for a vehicle illumination lamp, an outdoor lighting equipment, an air purifier, a water purifier, a medical instrument, a nursing care equipment, and the like.

For example, the base material preferably has the heat resistance from the viewpoint of providing the titanium oxide film according to this exemplary embodiment on the base material by the above-described manufacturing method. As the base material, from the viewpoint of the heat resistance, a base material containing a material selected from the group consisting of a glass, a ceramic, a metal, and a heat-resistant resin is preferable, and a base material formed of a material selected from the group consisting of a glass, a ceramic, a metal, and a heat-resistant resin is more preferable, although there is no particular limitation.

An interlayer may be disposed between the base material and the photocatalytic film. The interlayer is provided, for example, for a purpose of suppressing damage to the base material due to photoexcitation of the photocatalytic film, and for a purpose of suppressing peeling, cracking, or warpage of the photocatalytic film.

Examples of the interlayer include a film formed of metals such as chromium, aluminum, titanium, and iron or alloys thereof; metal oxides such as silicon, aluminum, tantalum, cerium, indium, and tin; or metal fluorides such as calcium, magnesium, and aluminum. The interlayer may be laminated on the base material as a single-layer, or may be laminated as two or more layers. The interlayer may contain and function as a conductive material, a heat generating material, or the like.

EXAMPLES

Hereinafter, the exemplary embodiment of the invention will be described with reference to examples, but the exemplary embodiment of the invention is not limited to these examples. In the following description, "parts" is based on mass unless otherwise specified.

Manufacturing of Titanium Oxide Film

Example 1

15 mL of an isopropanol solution of 85% by mass of titanium tetraisopropoxide is added to 75 mL of water, 0.5 mL of nitric acid is added as a catalyst to the resultant mixture and hydrolyzed, and then the hydrolyzed mixture is held at a temperature of 40° C. for 60 minutes, and therefore a titania sol is obtained. Subsequently, 0.7 g (10 g/m$^2$ in terms of solid contents) of the titania sol is dropwise added to a surface of a glass plate (5 cm square), and then is spread using a 10 mm diameter stainless steel roll wound with a 20 μm diameter stainless steel wire. Subsequently, the coated surface of the glass plate is dried and then heated in a firing furnace at 450° C. for 0.5 hours, and therefore a titanium oxide layer is obtained.

0.15 g of a solution of isobutyltrimethoxysilane diluted 20 times with methanol (60 g of solution per 1 m$^2$, 30% by mass of an organometallic compound with respect to an amount of the titanium oxide layer, 3 g of the organometallic compound with respect to 1 m$^2$ of a surface area of the titanium oxide layer) is applied to the titanium oxide layer on the glass plate, and left to stand for 30 minutes and then dried. Subsequently, a heating treatment is performed in an electric furnace at 400° C. for 1 hour, and therefore a target titanium oxide film is obtained.

Examples 2 and 3

A titanium oxide film is obtained in the same manner as in Example 1 except that a calcinating temperature for forming the titanium oxide layer by calcinating the titania sol on the glass plate is changed as described in Table 1.

Examples 4 and 5

A titanium oxide film is obtained in the same manner as in Example 1 except that a temperature of the heating treatment after the surface treatment of the titanium oxide layer with isobutyltrimethoxysilane is changed as described in Table 1.

Examples 6 and 7

A titanium oxide film is obtained in the same manner as in Example 1 except that an amount of application of isobutyltrimethoxysilane is changed as described in Table 1.

Examples 8 to 10

A titanium oxide film is obtained in the same manner as in Example 1 except that an amount of application of the titania sol is changed as described in Table 1.

Comparative Example A 30 parts of isobutyltrimethoxysilane with respect to 100 parts of titanium oxide particles is dropwise added to a dispersion in which commercially available anatase titanium oxide particles (volume average particle diameter of 80 nm) are dispersed in toluene, and reacted at 40° C. for 1 hour, and then the resultant mixture is spray-dried at an outlet temperature of 120° C., and therefore a dry powder is obtained. The obtained dry powder is subjected to a heating treatment at 400° C. for 1 hour in an electric furnace, and therefore a surface-modified titanium oxide particles are obtained.

2 parts of the surface-modified titanium oxide particles, 8 parts of silicone (KR-400 manufactured by Shin-Etsu Chemical Co., Ltd.) as a binder, and 90 parts of toluene (reagent manufactured by Wako Pure Chemical Corporation) as a solvent are mixed, the resultant mixture is subjected to a dispersion treatment, and therefore an application liquid for forming a photocatalytic film is obtained. The application liquid is applied to an entire surface of one main surface of a glass plate (5 cm square) and dried, and therefore the photocatalytic film is formed.

Comparative Example 1

A titanium oxide film is obtained in the same manner as in Example 1 except that the titanium oxide layer is subjected to the heating treatment without the surface treatment with isobutyltrimethoxysilane.

Comparative Example 2

A titanium oxide film is obtained in the same manner as in Example 1 except that the titanium oxide layer is not subjected to the heating treatment after being subjected to the surface treatment with isobutyltrimethoxysilane.

Comparative Examples 3 and 4

A titanium oxide film is obtained in the same manner as in Example 1 except that a temperature of the heating treatment after the surface treatment of the titanium oxide layer with isobutyltrimethoxysilane is changed as described in Table 1.

Comparative Examples 5 and 6

A titanium oxide film is obtained in the same manner as in Example 1 except that an amount of application of isobutyltrimethoxysilane is changed as described in Table 1.

Comparative Example 7

A titanium oxide film is obtained in the same manner as in Example 1 except that an amount of application of the titania sol is changed as described in Table 1.

Examples 11 to 17

A titanium oxide film is obtained in the same manner as in Example 1 except that isobutyltrimethoxysilane is changed to another silane compound.

Example 18

A titanium oxide film is obtained in the same manner as in Example 1 except that isobutyltrimethoxysilane is changed to 1,1,1,3,3,3-hexamethyldisilazane.

Example 19

A titanium oxide film is obtained in the same manner as in Example 1 except that isobutyltrimethoxysilane is changed to acetoalkoxyaluminum diisopropylate (AJINOMOTO CO., INC., PLENACT AL-M).

Example 20

A titanium oxide film is obtained in the same manner as in Example 1 except that isobutyltrimethoxysilane is changed to isopropyl triisostearoyl titanate (AJINOMOTO CO., INC., PLENACT TTS).

Example 21

A titanium oxide film is obtained in the same manner as in Example 1 except that titanium alkoxide used for forming the titanium oxide layer is changed from titanium tetraisopropoxide to tetrabutoxy titanium.

Comparative Example 21

A titanium oxide film is obtained in the same manner as in Example 21 except that the titanium oxide layer is subjected to the heating treatment without the surface treatment with isobutyltrimethoxysilane.

Example 31

A titanium oxide film is obtained in the same manner as in Example 1 except that the glass plate is changed to a stainless steel plate (5 cm square).

Example 32

A titanium oxide film is obtained in the same manner as in Example 1 except that the glass plate is changed to a polyimide film (5 cm square).

Measurement of Physical Properties of Titanium Oxide Film Ultraviolet-Visible Absorption Spectrum With the titanium oxide film on the base material as a measurement target, a spectrophotometer (U-4100 manufactured by Hitachi High-Technologies Corporation) is used, and a scanning speed: 600 nm, a slit width: 2 nm, a sampling interval: 1 nm are respectively set, and therefore a diffuse reflectance spectrum within a wavelength range of 200 nm to 900 nm in a diffuse reflectance arrangement is measured. Based on the diffuse reflectance spectrum, a theoretical absorbance at each wavelength is obtained by Kubelka-Munk transformation, and therefore the ultraviolet-visible absorption spectrum is obtained.

In Table 1, "UV-Vis characteristics" show absorbances at wavelengths of 450 nm, 600 nm, and 750 nm, respectively, in a case where the absorbance at a wavelength of 350 nm is set to 1.

The absorption occurs in the titanium oxide films of Examples 1 to 21, 31, and 32 within an entire range of wavelengths of 400 nm to 800 nm.

Infrared Absorption Spectrum

With the titanium oxide film on the base material as a measurement target, an infrared absorption spectrum is obtained by measuring a wavenumber range of 650 $cm^{-1}$ to 4000 $cm^{-1}$ by a total reflection measurement method using diamond as a spectroscopic crystal by using an infrared spectrophotometer (FT-IR-410 manufactured by JASCO Corporation) under conditions of a cumulative number of 300 times and resolution of 4 $cm^{-1}$.

Surface Roughness

With the titanium oxide film on the base material as a measurement target, the surface of the film is measured at any four positions (two positions in a width direction×two positions in a length direction), and a mean value is defined as the surface roughness RzJIS of the film (ten-point mean roughness) by using a surface roughness and shape measuring instrument (SURFCOM 1400 A series manufactured by Tokyo Seimitsu Co., Ltd.) under conditions of a measurement length 2.5 mm, a cutoff wavelength 0.8 mm, and a measurement speed 0.60 mm/s (according to JIS B 0601 (2013)).

Water Contact Angle

The measurement is performed by the above-describe method by using a model number CA-XP manufactured by Kyowa Interface Science Co., Ltd. as the contact angle meter.

Performance Evaluation of Titanium Oxide Film Photocatalytic Activity of Photocatalytic Film (Degradability of Methylene Blue)

100 mL of an aqueous methylene blue solution having a methylene blue concentration of 20 ppm (mass basis) is put in a glass petri dish with a diameter of 10 cm, and the titanium oxide film (including a base material on a lower surface) is immersed into the aqueous methylene blue solution and left to stand. Two samples are prepared. Hereinafter, the two samples are referred to as Sample 1 and Sample 2.

Using a light emitting diodes that radiate visible light having wavelengths of 400 nm to 550 nm deviating from an absorption wavelength region of methylene blue (wavelengths of 550 nm to 800 nm), visible light is continuously irradiated to Sample 1 for 7 hours immediately after the sample production. Sample 2 is stored in a dark place for 7 hours immediately after the sample production.

A part of the aqueous methylene blue solution in the glass petri dish is collected, immediately after the sample production of Sample 1, after continuous irradiation of visible light of Sample 1, immediately after the sample production of Sample 2, and after storage of Sample 2 in the dark place, respectively, and a light transmittance at a wavelength of 650 nm is measured by using a spectrophotometer (Optima Co., Ltd., Model No. SP-300). As methylene blue is degraded by the photocatalytic activity of the titanium oxide film, the light transmittance at a wavelength of 650 nm becomes higher. A light transmittance fluctuation value $\Delta T$ which is an index of the photocatalytic activity is obtained based on the following formula, and classified as A to E below.

Light transmittance fluctuation value $\Delta T = \Delta T1 - \Delta T2$ $\Delta T1$ = light transmittance after continuous irradiation of visible light of Sample 1 – light transmittance immediately after the sample production of Sample 1

$\Delta T2$ = light transmittance after storage of Sample 2 in the dark place – light transmittance immediately after the sample production of Sample 2

A: $25\% \leq \Delta T$
B: $15\% \leq \Delta T < 25\%$
C: $6\% \leq \Delta T < 15\%$
D: $4\% \leq \Delta T < 6\%$
E: $\Delta T < 4\%$ Contamination Resistance of Photocatalytic Film As a contaminant, a suspension is prepared by mixing 5 parts of carbon powder, 40 parts of water, and 45 parts of ethanol. 5 g of the suspension is applied to the titanium oxide film (including the base material on the lower surface) by a range of 25±1 mm×40±1 mm, and stored in an atmosphere at a temperature of 40° C. for 1 hour, and then the applied parts are washed with 50 g of an aqueous solution of 50% by mass ethanol. The applied parts are visually observed and classified as A to E below.

A: Not distinguishable from a part not applied with the contaminant, and trace of contamination is not recognized B: Trace of contamination is recognized, and a trace area of contamination is less than 5% with respect to the area to which the contaminant is applied C: Trace of contamination is recognized, and a trace area of contamination is 5% or more and less than 20% with respect to the area to which the contaminant is applied D: Trace of contamination is recognized, and a trace area of contamination is 20% or more and less than 30% with respect to the area to which the contaminant is applied E: Trace of contamination is recognized, and a trace area of contamination is 30% or more with respect to the area to which the contaminant is applied

TABLE 1

| | | Formation of titanium oxide layer | | | | |
|---|---|---|---|---|---|---|
| | Material of base material | Titanium alkoxide | Application amount of titania sol (in terms of solid contents) [g/m$^2$] | Calcination temperature [C.°] | Calcination time [hours] | Surface treatment Organometallic compound Type |
| Comparative Example A | Glass | Photocatalytic film formed by applying surface-modified titanium oxide particles together with binder | | | | |
| Example 1 | Gloss | Titanium tetraisopropoxide | 10 | 450 | 0.5 | Isobutyltrimethoxysilane |
| Example 2 | Glass | Titanium tetraisopropoxide | 10 | 200 | 0.5 | Isobutyltrimethoxysilane |
| Example 3 | Glass | Titanium tetraisopropoxide | 10 | 650 | 0.5 | Isobutyltrimethoxysilane |
| Example 4 | Glass | Titanium tetraisopropoxide | 10 | 450 | 0.5 | Isobutyltrimethoxysilane |
| Example 5 | Glass | Titanium tetraisopropoxide | 10 | 450 | 0.5 | Isobutyltrimethoxysilane |
| Example 6 | Glass | Titanium tetraisopropoxide | 10 | 450 | 0.5 | Isobutyltrimethoxysilane |
| Example 7 | Glass | Titanium tetraisopropoxide | 10 | 450 | 0.5 | Isobutyltrimethoxysilane |
| Example 8 | Glass | Titanium tetraisopropoxide | 0.1 | 450 | 0.5 | Isobutyltrimethoxysilane |

TABLE 1-continued

| | | | | | | |
|---|---|---|---|---|---|---|
| Example 9 | Glass | Titanium tetraisopropoxide | 18 | 450 | 0.5 | Isobutyltrimethoxysilane |
| Example 10 | Glass | Titanium tetraisopropoxide | 20 | 450 | 0.5 | Isobutyltrimethoxysilane |
| Comparative Example 1 | Glass | Titanium tetraisopropoxide | 10 | 450 | 0.5 | — |
| Comparative Example 2 | Glass | Titanium tetraisopropoxide | 10 | 450 | 0.5 | Isobutyltrimethoxysilane |
| Comparative Example 3 | Glass | Titanium tetraisopropoxide | 10 | 450 | 0.5 | Isobutyltrimethoxysilane |
| Comparative Example 4 | Glass | Titanium tetraisopropoxide | 10 | 450 | 0.5 | Isobutyltrimethoxysilane |
| Comparative Example 5 | Glass | Titanium tetraisopropoxide | 10 | 450 | 0.5 | Isobutyltrimethoxysilane |
| Comparative Example 6 | Glass | Titanium tetraisopropoxide | 10 | 450 | 0.5 | Isobutyltrimethoxysilane |
| Comparative Example 7 | Glass | Titanium tetraisopropoxide | 0.03 | 450 | 0.5 | Isobutyltrimethoxysilane |
| Example 11 | Glass | Titanium tetraisopropoxide | 10 | 450 | 0.5 | Methyltrimethoxysilane |
| Example 12 | Glass | Titanium tetraisopropoxide | 10 | 450 | 0.5 | Ethyltrimethoxysilane |
| Example 13 | Glass | Titanium tetraisopropoxide | 10 | 450 | 0.5 | Hexyltrimethoxysilane |
| Example 14 | Glass | Titanium tetraisopropoxide | 10 | 450 | 0.5 | Decyltriethoxysilane |
| Example 15 | Glass | Titanium tetraisopropoxide | 10 | 450 | 0.5 | Dodecyltriethoxysilane |
| Example 16 | Glass | Titanium tetraisopropoxide | 10 | 450 | 0.5 | Octadecyltrimethoxysilane |
| Example 17 | Glass | Titanium tetraisopropoxide | 10 | 450 | 0.5 | Phenyltrimethoxysilane |
| Example 18 | Glass | Titanium tetraisopropoxide | 10 | 450 | 0.5 | Hexamethyldisilazane |
| Example 19 | Glass | Titanium tetraisopropoxide | 10 | 450 | 0.5 | Acetoalkoxyaluminum diisopropylate |
| Example 20 | Glass | Titanium tetraisopropoxide | 10 | 450 | 0.5 | Isopropyl triisostearoyl titanate |
| Example 21 | Glass | Tetrabutoxysilane | 10 | 450 | 0.5 | Isobutyltrimethoxysilane |
| Comparative Example 21 | Glass | Tetrabutoxysilane | 10 | 450 | 0.5 | — |
| Example 31 | Stainless steel | Titanium tetraisopropoxide | 10 | 450 | 0.5 | Isobutyltrimethoxysilane |
| Example 32 | Polyimide | Titanium tetraisopropoxide | 10 | 450 | 0.5 | Isobutyltrimethoxysilane |

| | Surface treatment Organometallic compound Amount | | Heating treatment | | Film thickness [µm] | UV-Vis characteristics | |
|---|---|---|---|---|---|---|---|
| | With respect to amount of titanium oxide layer [% by mass] | With respect to surface area of titanium oxide layer [g/m²] | Temperature [C.°] | Time [hours] | | Absorbance at 450 nm | Absorbance at 600 nm |
| Comparative Example A | Photocatalytic film formed by applying surface-modified titanium oxide particles together with binder | | | | 4.5 | 0.48 | 0.33 |
| Example 1 | 30 | 3 | 400 | 1 | 2.6 | 0.56 | 0.41 |
| Example 2 | 30 | 3 | 400 | 1 | 2.6 | 0.59 | 0.43 |
| Example 3 | 30 | 3 | 400 | 1 | 2.6 | 0.60 | 0.45 |
| Example 4 | 30 | 3 | 180 | 1 | 2.6 | 0.24 | 0.15 |
| Example 5 | 30 | 3 | 500 | 1 | 2.6 | 0.28 | 0.19 |
| Example 6 | 15 | 1.5 | 400 | 1 | 2.5 | 0.28 | 0.19 |
| Example 7 | 90 | 9 | 400 | 1 | 2.7 | 0.66 | 0.47 |
| Example 8 | 30 | 0.03 | 400 | 1 | 0.03 | 0.34 | 0.22 |
| Example 9 | 30 | 5.4 | 400 | 1 | 4.6 | 0.58 | 0.44 |
| Example 10 | 30 | 6 | 400 | 1 | 5.0 | 0.57 | 0.43 |
| Comparative Example 1 | 0 | 0 | 400 | 1 | 2.5 | 0.00 | 0.00 |
| Comparative Example 2 | 30 | 3 | Not performed | | 2.6 | 0.00 | 0.00 |
| Comparative Example 3 | 30 | 3 | 120 | 1 | 2.6 | 0.00 | 0.00 |
| Comparative Example 4 | 30 | 3 | 600 | 1 | 2.6 | 0.00 | 0.00 |

TABLE 1-continued

| | | | | | | | |
|---|---|---|---|---|---|---|---|
| Comparative Example 5 | 8 | 0.8 | 400 | 1 | 2.5 | 0.00 | 0.00 |
| Comparative Example 6 | 110 | 11 | 400 | 1 | 2.8 | 0.10 | 0.05 |
| Comparative Example 7 | 30 | 0.009 | 400 | 1 | 0.01 | 0.00 | 0.00 |
| Example 11 | 30 | 3 | 400 | 1 | 2.6 | 0.64 | 0.46 |
| Example 12 | 30 | 3 | 400 | 1 | 2.6 | 0.64 | 0.43 |
| Example 13 | 30 | 3 | 400 | 1 | 2.6 | 0.65 | 0.45 |
| Example 14 | 30 | 3 | 400 | 1 | 2.6 | 0.62 | 0.45 |
| Example 15 | 30 | 3 | 400 | 1 | 2.6 | 0.64 | 0.46 |
| Example 16 | 30 | 3 | 400 | 1 | 2.6 | 0.62 | 0.44 |
| Example 17 | 30 | 3 | 400 | 1 | 2.6 | 0.51 | 0.36 |
| Example 18 | 30 | 3 | 400 | 1 | 2.6 | 0.35 | 0.23 |
| Example 19 | 30 | 3 | 400 | 1 | 2.6 | 0.42 | 0.28 |
| Example 20 | 30 | 3 | 400 | 1 | 2.6 | 0.49 | 0.36 |
| Example 21 | 30 | 3 | 400 | 1 | 2.6 | 0.56 | 0.38 |
| Comparative Example 21 | 0 | 0 | 400 | 1 | 2.5 | 0.00 | 0.00 |
| Example 31 | 30 | 3 | 400 | 1 | 2.6 | 0.62 | 0.47 |
| Example 32 | 30 | 3 | 400 | 1 | 2.6 | 0.64 | 0.42 |

| | UV-Vis characteristics Absorbance at 750 nm | IR characteristics Wavenumber of absorption peak [cm$^{-1}$] | Surface property Surface roughness [μm] | Surface property Water contact angle [degrees] | Performance evaluation Photocatalytic activity | Performance evaluation Contamination resistance |
|---|---|---|---|---|---|---|
| Comparative Example A | 0.17 | 2840/2890 | 0.25 | 125 | C | D |
| Example 1 | 0.24 | 2852/2920 | 0.02 | 152 | A | A |
| Example 2 | 0.26 | 2846/2924 | 0.03 | 173 | B | A |
| Example 3 | 0.30 | 2849/2922 | 0.02 | 160 | B | A |
| Example 4 | 0.08 | 2854/2925 | 0.04 | 145 | B | A |
| Example 5 | 0.10 | 2849/2923 | 0.04 | 160 | B | A |
| Example 6 | 0.11 | 2850/2919 | 0.03 | 142 | C | A |
| Example 7 | 0.28 | 2844/2921 | 0.04 | 141 | C | A |
| Example 8 | 0.10 | 2850/2920 | 0.08 | 155 | C | B |
| Example 9 | 0.26 | 2851/2921 | 0.07 | 92 | C | B |
| Example 10 | 0.24 | 2853/2928 | 0.08 | 150 | C | B |
| Comparative Example 1 | 0.00 | None | 0.04 | 20 | E | E |
| Comparative Example 2 | 0.00 | 2857/2931 | 0.06 | 95 | E | D |
| Comparative Example 3 | 0.00 | 2856/2925 | 0.05 | 165 | E | B |
| Comparative Example 4 | 0.00 | None | 0.06 | 155 | E | B |
| Comparative Example 5 | 0.00 | None | 0.05 | 155 | E | B |
| Comparative Example 6 | 0.00 | 2855/2926 | 0.07 | 170 | D | C |
| Comparative Example 7 | 0.00 | 2851/2924 | 0.04 | 80 | E | E |
| Example 11 | 0.28 | 2848/2923 | 0.05 | 145 | C | B |
| Example 12 | 0.28 | 2849/2919 | 0.06 | 158 | A | A |
| Example 13 | 0.29 | 2853/2927 | 0.04 | 148 | B | B |
| Example 14 | 0.26 | 2851/2925 | 0.05 | 160 | B | A |
| Example 15 | 0.29 | 2855/2926 | 0.06 | 151 | B | B |
| Example 16 | 0.27 | 2848/2919 | 0.05 | 138 | C | B |
| Example 17 | 0.21 | 2847/2921 | 0.04 | 135 | C | B |
| Example 18 | 0.12 | 2854/2925 | 0.06 | 128 | C | B |
| Example 19 | 0.15 | 2841/2917 | 0.05 | 132 | C | B |
| Example 20 | 0.22 | 2831/2908 | 0.04 | 129 | C | B |
| Example 21 | 0.24 | 2855/2926 | 0.06 | 150 | B | B |
| Comparative Example 21 | 0.00 | None | 0.06 | 25 | E | E |
| Example 31 | 0.32 | 2853/2921 | 0.05 | 170 | B | B |
| Example 32 | 0.30 | 2848/2925 | 0.04 | 180 | B | B |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A titanium oxide film by continuous titanium oxide, comprising:
   a metallic compound that has a metal atom and a hydrocarbon group and is bonded to a surface of the titanium oxide film,
   wherein absorption occurs at wavelengths of 450 nm and 750 nm,
   wherein the titanium oxide film is a film in which particulate or powdered titanium oxide is not bonded by a component other than titanium oxide.

2. The titanium oxide film according to claim 1, wherein a surface roughness is within a range of 0 µm to 0.1 µm.

3. The titanium oxide film according to claim 1, wherein a water contact angle of the surface of the titanium oxide film is within a range of 90 degrees to 180 degrees.

4. The titanium oxide film according to claim 1, wherein absorption occurs within an entire range of wavelengths of 400 nm to 800 nm.

5. The titanium oxide film according to claim 1, wherein the metallic compound having the metal atom and the hydrocarbon group is bonded to the surface via an oxygen atom.

6. The titanium oxide film according to claim 5, wherein the metal atom is a silicon atom.

7. The titanium oxide film according to claim 1, wherein the hydrocarbon group is a saturated or an unsaturated aliphatic hydrocarbon group or aromatic hydrocarbon group having 1 to 20 carbon atoms.

8. The titanium oxide film according to claim 1, wherein the hydrocarbon group is a saturated aliphatic hydrocarbon group having 4 to 10 carbon atoms.

9. The titanium oxide film according to claim 1, wherein a mass per unit area is within a range of 0.04 g/m$^2$ to 20 g/m$^2$.

10. The titanium oxide film according to claim 1, wherein an absorption peak is in a wavenumber range of 2700 cm$^{-1}$ to 3000 cm$^{-1}$.

11. A titanium oxide film comprising:
    a continuous titanium oxide having an absorption peak in a wavenumber range of 2700 cm$^{-1}$ to 3000 cm$^{-1}$, and
    absorption occurs at wavelengths of 450 nm and 750 nm,
    wherein the titanium oxide film is a film in which particulate or powdered titanium oxide is not bonded by a component other than titanium oxide.

12. The titanium oxide film according to claim 11, wherein a metallic compound having a metal atom and a hydrocarbon group is bonded to a surface of the titanium oxide film, and
    absorption occurs at wavelengths of 450 nm and 750 nm.

13. The titanium oxide film according to claim 12, wherein the metal atom is a silicon atom.

14. The titanium oxide film according to claim 11, wherein a surface roughness is within a range of 0 µm to 0.1 µm.

15. The titanium oxide film according to claim 11, wherein a water contact angle of the surface of the titanium oxide film is within a range of 90 degrees to 180 degrees.

16. The titanium oxide film according to claim 11, wherein absorption occurs within an entire range of wavelengths of 400 nm to 800 nm.

17. The titanium oxide film according to claim 11, wherein a mass per unit area is within in a range of 0.04 g/m$^2$ to 20 g/m$^2$.

18. A structure comprising:
    a base material; and
    the titanium oxide film according to claim 1 that is disposed on the base material.

19. The structure according to claim 18, wherein the base material includes a material selected from the group consisting of a glass, a ceramic, a metal, and a heat-resistant resin.

* * * * *